United States Patent [19]

Brown

[11] 3,944,095
[45] Mar. 16, 1976

[54] ROUND BALE TRAILER WITH LOADING WINCH AND BRIDLE

[76] Inventor: Robert Lawrence Brown, P.O. Box 47A, Orrville, Ala. 36767

[22] Filed: Feb. 24, 1975

[21] Appl. No.: 552,067

[52] U.S. Cl. ............ 214/506; 214/85.5; 214/DIG. 4
[51] Int. Cl.² .............................................. B60P 1/28
[58] Field of Search ........... 214/505, 506, 501, 517, 214/85.1, 85.5, 352, DIG. 1, DIG. 4, 130 C, 92, DIG. 3, 77 R

[56] References Cited
UNITED STATES PATENTS

| | | | |
|---|---|---|---|
| 1,914,098 | 6/1933 | Bean | 214/505 X |
| 3,877,595 | 4/1975 | Edelman | 214/506 |

*Primary Examiner*—Albert J. Makay
*Attorney, Agent, or Firm*—Clarence A. O'Brien; Harvey B. Jacobson

[57] ABSTRACT

A trailer includes a wheeled frame and a generally horizontal load bed pivotally mounted on the frame for movement about a horizontal axis. An upstanding abutment is provided at the forward end of the load bed. A tension member trained over the top of the abutment is at one end wound about a winding member located at the front of the trailer and at the other end is provided with an anchor. An adjustable length bridle engages the anchor at its mid-portion. A pair of spikes are secured to the opposite ends of the bridle. The spikes are insertable into the opposite axial ends of a bale. Pressure exerted by the winding member on the tension member rolls the bale onto the tilted ground engaging load bed. Further winding of the tension member produces a forward and downward thrust on the upstanding abutment whereupon the bale and load bed are pivoted to a load carrying position.

8 Claims, 7 Drawing Figures

ROUND BALE TRAILER WITH LOADING WINCH AND BRIDLE

BACKGROUND OF THE INVENTION

Various forms of mobile vehicles have been heretofore provided for loading and transporting generally cylindrical loads. Some of these mobile vehicles have included rearwardly and downwardly tiltable load beds whereby the cylindrical load to be transported may be rolled up onto the load bed, but these previously known mobile vehicles have not been specifically designed for use in loading and transporting round bales.

Examples of previously patented mobile structures including some of the general structural features of the instant invention are disclosed in U.S. Pat. Nos. 45,643, 51,294, 1,352,898, 1,823,380, 2,550,230, 2,934,229, 3,013,676, 3,415,400 and 3,424,362.

BRIEF DESCRIPTION OF THE INVENTION

The round bale loading and transport vehicle of the instant invention comprises a trailer equipped with a rearwardly and downwardly tiltable load bed for positioning of the lower marginal edge portion of the load bed beneath the lower peripheral portion of the adjacent side of a cylindrical bale extending along the lower side of the load bed. The remote marginal portion of the load bed includes an upstanding abutment over an upper portion of which the mid-portion of a flexible tension member is guided. The front end of the tension member is partially wound upon the winding member carried by a forward portion of the trailer and an adjustable length bridle is provided on its opposite ends with spikes for lengthwise insertion into the center portions of the opposite ends of a round bale. The rear end of the tension member is anchorable to the mid-portion of the bale whereby a forward pull on the tension member will cause the bale to be rolled up onto the load bed with subsequent contact of the bale with the upstanding abutment member causing the load bed to be tilted to a horizontal position.

The main object of this invention is to provide an inexpensive pickup and transport device for large round bales of hay.

Another object of this invention, in accordance with the immediately preceding object, is to provide a pickup and transport vehicle for round hay bales which may be readily trailed behind any suitable draft vehicle such as a truck or tractor.

Still another object of this invention is to provide a bale pickup and transport vehicle which may be readily constructed so as to be compatible with round bales of different sizes.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more more fully hereinafter described and claimed, reference being had to the accompanying drawings forming a part hereof, wherein like numerals refer to like parts throughout.

DETAILED DESCRIPTION OF THE INVENTION

Figure 1:
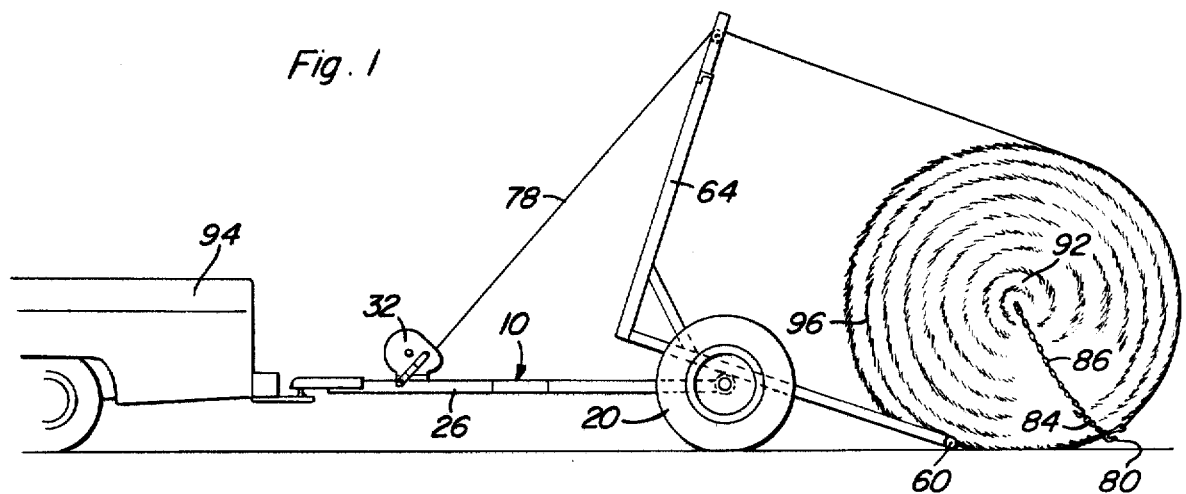
FIG. 1 is a side elevational view of the trailer of the instant invention with the forward tongue portion thereof operably coupled to the rear end of a draft vehicle and with a round hay bale in position relative to the rear marginal edge portion of the rearwardly and downwardly tiltable load bed of the trailer for loading onto the load bed by rolling forward movement of the hay bale upwardly along the load bed.
Figure 2:
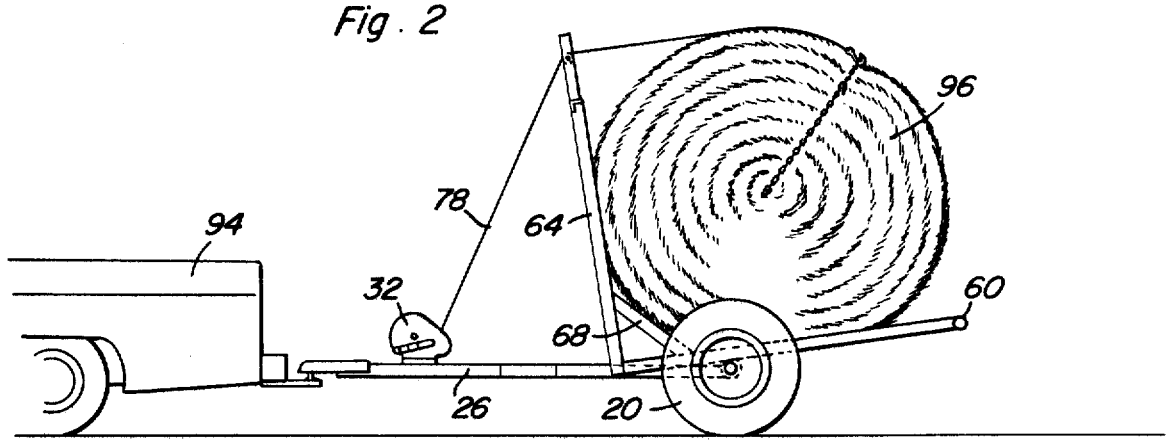
FIG. 2 is a side elevational view similar to FIG. 1 but with the round hay bale fully loaded onto the trailer and the load bed thereof tilted forwardly and downwardly to a transport position.
Figure 3:
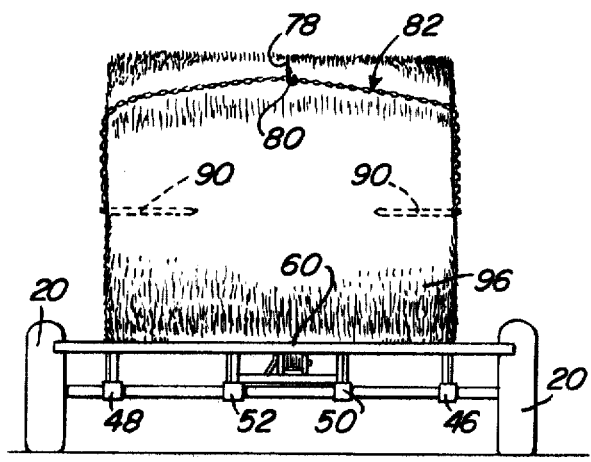
FIG. 3 is a rear elevational view of the assemblage illustrated in FIG. 2.
Figure 4:
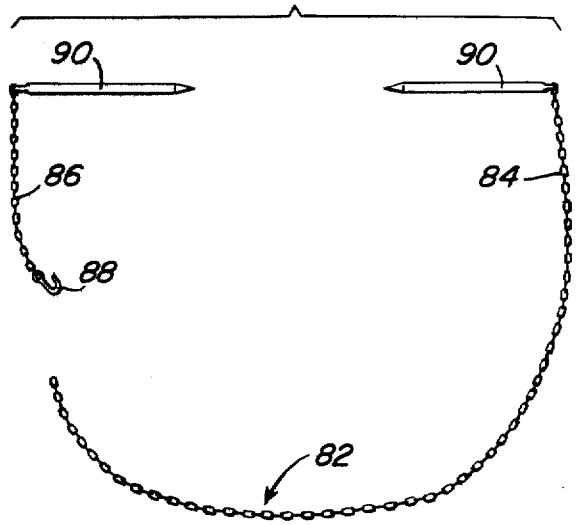
FIG. 4 is a plan view of the adjustable length bridle structure of the instant invention.
Figure 5:
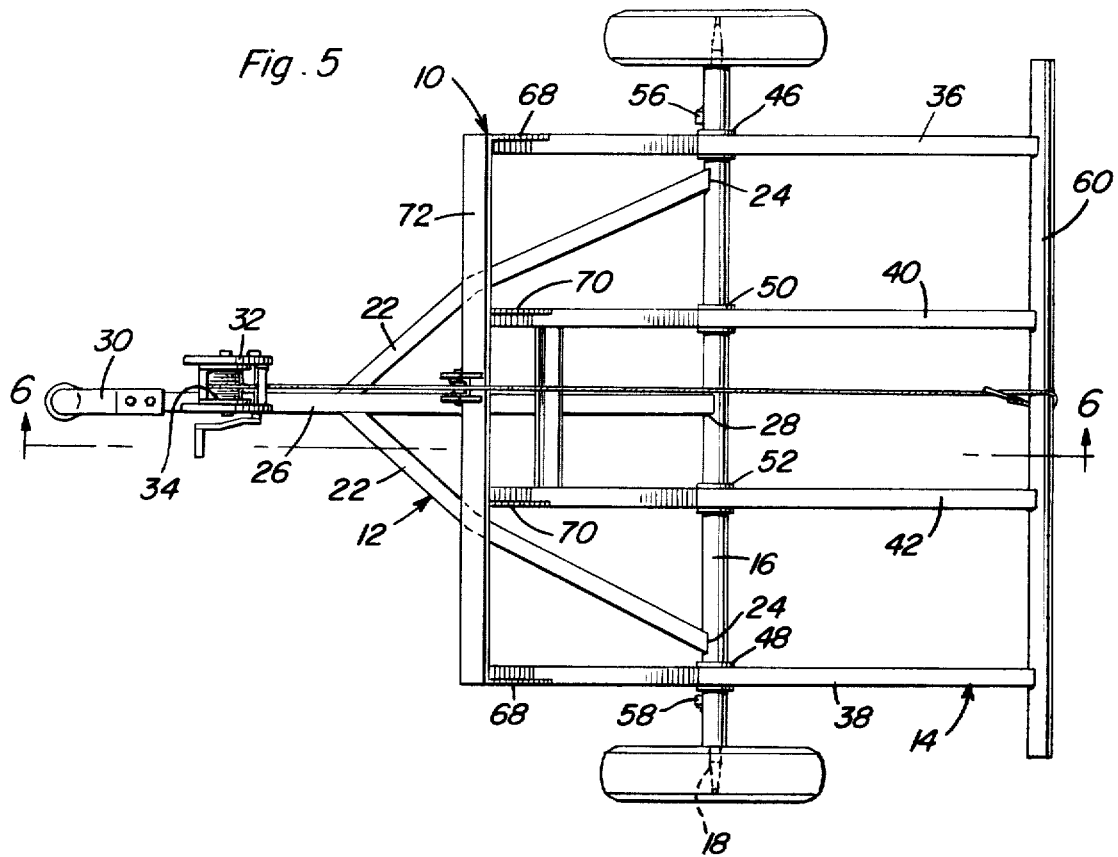
FIG. 5 is a top plan view of the trailer.

Referring now more specifically to the drawings, the numeral 10 generally designates the trailer of the instant invention. The trailer 10 includes a main frame referred to in general by the reference numeral 12 and an oscillatable load bed referred to in general by the reference numeral 14.

The main frame 12 includes a transverse tubular axle 16 from whose opposite ends wheel journaling spindle portions 18 are supported. Suitable support wheel assemblies 20 are journaled from the spindles or spindle portions 18 and the rear ends of a pair of forwardly convergent frame members 22 are secured to opposite end portions of the axle 16 as at 24 in any convenient manner such as by welding. The frame 12 further includes a center longitudinal member 26 having its rear end portion secured to the center of the axle 16 as at 28 and the forward ends of the forwardly convergent members or arms 22 are secured to corresponding opposite side portions of the longitudinal member 26. The forward end of the longtiudinal member 26 includes a trailer coupling assembly 30 and a hand-operable winch assembly 32 including a rotatable winding member 34 is supported from the longitudinal member 26 rearwardly of the trailer coupling structure 30.

The load bed 14 is generally rectangular in configuration and includes a pair of opposite side longitudinal members 36 and 38 and also a pair of transversely spaced central longitudinal members 40 and 42. The longitudinal members 36, 38, 40 and 42 include dependingly supported axially aligned horizontal sleeve portions 46, 48, 50 and 52, respectively, journaled on the axle 16 and the latter includes a pair of radially outwardly projecting abutments 56 and 58 with which the axially remote ends of the sleeves 46 and 48 are engageable to limit shifting of the load bed 14 along the axle 16. The rear ends of the longitudinal members 36, 38, 40 and 42 are interconnected by means of a rear transverse member 60 in the form of a cylindrical member and the front ends of the members 40 and 42 are interconnected by means of a forward transverse member 62 which is in the form of an angle member. In addition, a pair of angle member uprights 64 have their lower ends secured to forward end portions of the longitudinal members 36 and 38 and a pair of similar transversely spaced center uprights 66 have their lower ends secured to opposite side central portions of the front transverse member 62. Angle braces 68 are secured between the longitudinal members 36 and 38 and the uprights 64 and similar angle member inclined braces 70 are secured between the forward ends of the longitudinal members 40 and 42 and the uprights 66.

The upper ends of the uprights 64 and 66 are interconnected by means of an upper transverse angle member 72 and a pair of upstanding angle members 74 project upwardly from closely spaced central portions of the upper transverse member 72 and rotatably journal a guide pulley 76 between their upper ends.

An elongated flexible tension member 78 has one end thereof wound about the winding member 34, its mid-portion passed over the guide pulley 76 and the opposite end portion thereof provided with a hook 80. Further, with attention now invited more specifically to FIGS. 1 through 4 of the drawings, an adjustable length bridle member assembly is referred to in general by the reference numeral 82 and includes a pair of opposite end sections 84 and 86. The sections 84 and 86 are flexible and one end of the section 86 is provided with a hook 88 selectively engageable with longitudinally spaced portions of the section 84, the latter comprising a length of link chain.

The end of the section 86 remote from the hook 88 and the corresponding end of the section 84 each have one end of an elongated rigid spike 90 attached thereto and the spikes 90 are lengthwise insertable into the central areas 92 of the opposite axial ends of a round (cylindrical) hay bale.

Figure 6:
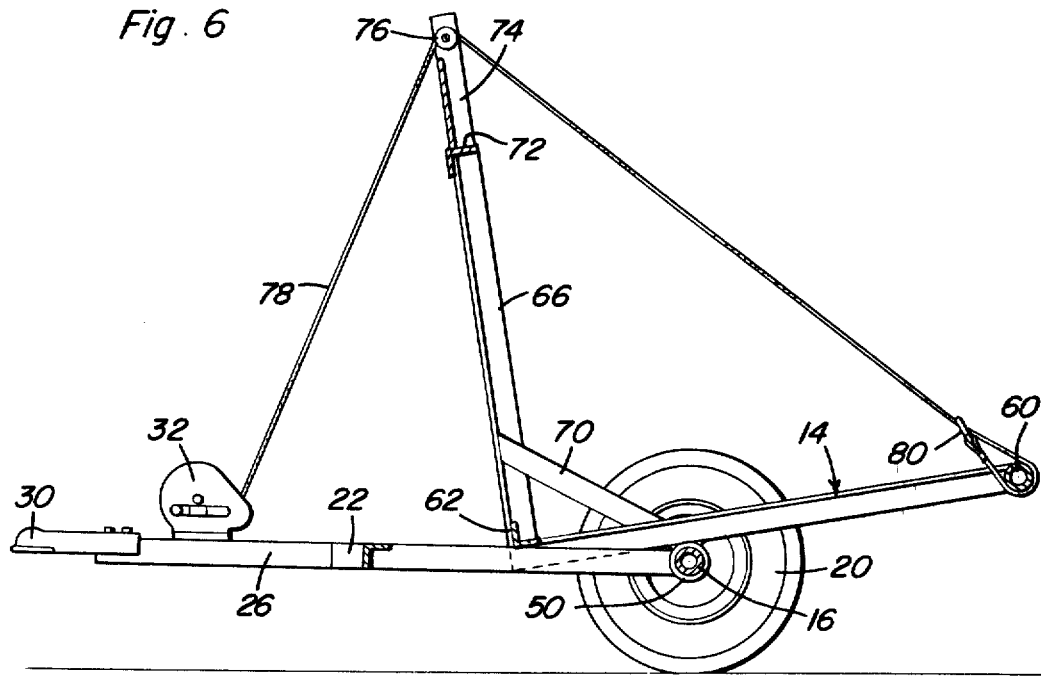
FIG. 6 is a fragmentary longitudinal vertical sectional view taken substantially upon the plane indicated by the section line 6-6 of FIG. 5.
Figure 7:
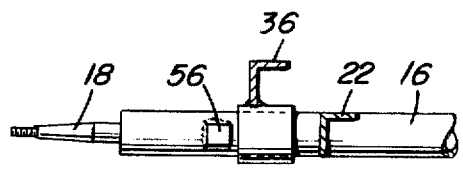
FIG. 7 is a fragmentary transverse vertical sectional view illustrating the manner in which the tiltable load bed of the trailer is oscillatably supported from the main frame thereof.

In operation, when the trailer 10 is in transit without a round hay bale disposed thereon, the free end of the tension member 78 is passed about the central portion of the rear transverse member 60 and the hook 80 is engaged with that portion of the tension member 78 extending between the pulley 76 and the rear transverse member, see FIG. 6. When the tension member 78 is under tension, a forward and downward thrust is exerted on the pulley 78 which causes the load bed 14 to be tilted to the forwardly and downwardly inclined position thereof illustrated in FIG. 6 of the drawings with the central portion of the transverse member 62 abutted against the upper surface of the opposing rear portion of the longitudinal member 26. However, when it is desired to load a round or cylindrical hay bale onto the trailer 10, the tension member 78 has a portion thereof unwound from the winding memer 34 sufficient to enable the hook 80 to be disengaged with that portion of the tension member 78 extending between the pulley 76 and the rear transverse member 60. When the tension member 78 has been disconnected from the rear transverse member 60, the load bed 14 may be tilted to the rearwardly and downwardly inclined position thereof illustrated in FIG. 1 of the drawings and the draft vehicle 94 to which the trailer 10 is removably coupled may be rearwardly advanced in order to position the rear transverse member 60 beneath an adjacent lower peripheral portion of the hay bale 96.

Then, the spikes 90 may be lengthwise inserted into the central areas 92 of the opposite ends of the bale 96 and the section 86 may have its hook 88 engaged with the section 84 in a removable manner and with the bridle member 82 tightened about the hay bale in the manner illustrated in FIG. 1. Then, the free rear end of the tension member 78 is draped downwardly over the bale 96 and the hook 80 is engaged with the mid-portion of the bridle member 82. Thereafter, the winch assembly 32 is actuated to wind the tension member 78 thereon whereby the hay bale 96 will be rolled up onto the load bed 14 until the bale 96 engages the uprights 64 and 66. Then, further winding of the tension member 78 onto the winding member 34 will cause the load bed 14 to tilt from the rearwardly and downwardly inclined position thereof illustrated in FIG. 1 of the drawings to the forwardly and downwardly inclined position illustrated in FIG. 2 of the drawings with the hay bale 96 fully and securely loaded onto the load bed 14. Thereafter, the draft vehicle 94 may be utilized to tow the trailer to any suitable unloading point whereupon the tension member 78 may be unwound from the winding member 34 in order to allow the load bed 14 to again assume a rearwardly and downwardly inclined position and the hay bale 96 to roll rearwardly therefrom by gravity.

The foregoing is considered as illustrative only of the principles of the invention. Further, since numerous modifications and changes will readily occur to those skilled in the art, it is not desired to limit the invention to the exact constructiion and operation shown and described, and accordingly all suitable modifications and equivalents may be resorted to, falling within the scope of the invention.

What is claimed as new is as follows:

1. A round bale loading and transport vehicle comprising a mobile frame, a generally horizontal load bed pivotally mounted on said frame for tilting between a generally horizontal transport position and an inclined position with a first lower marginal edge of said load bed at least closely adjacent the support surface upon which said vehicle is supported, an adjustable length flexible bridle including a pair of elongated spikes having one pair of corresponding end portions anchored to the opposite ends of said bridle and a second pair of corresponding end portions adapted to be lengthwise inserted into the central areas of the opposite axial ends of a round bale, an elongated flexible tension member including one end removably anchorable to the mid-portion of said bridle, said transport including pull means engaged with the other end portion of said tension member operative to apply a lengthwise generally horizontal pull on said tension member at an elevation above said load bed toward a second marginal edge portion of said load bed remote from said first marginal edge.

2. The combination of claim 1 wherein said load bed includes an elevated abutment portion adjacent said second marginal edge portion against which a bale being rolled onto said load bed from said lower marginal edge portion may be abutted, whereby a further pull on said tension member will cause said load bed to tilt from said inclined position to said horizontal position.

3. The combination of claim 1 wherein said vehicle includes a longitudinal extent extending in the direction of intended travel of said vehicle, the pivot axis of said load bed extending generally normal to said longitudinal extent.

4. The combination of claim 1 wherein said load bed is positioned with said first marginal edge portion inclined upwardly when said load bed is in said transport position.

5. The combination of claim 1 wherein said vehicle includes a longitudinal extent extending in the direction of intended travel of said vehicle, the pivot axis of said load bed extending generally normal to said longitudinal extent, said vehicle including front and rear ends, said first marginal edge portion of said load bed comprising the rear end thereof.

6. The combination of claim 5 wherein said vehicle comprises a wheeled trailer and the forward end of said frame includes a forwardly projecting tongue with means at its forward end for releasable attachment to a draft vehicle.

7. The combination of claim 1 wherein said load bed includes an elevated abutment portion adjacent said second marginal edge portion against which a bale being rolled onto said load bed from said lower marginal edge portion may be abutted, whereby a further pull on said tension member will cause said load bed to tilt from said inclined position to said horizontal position, an upper portion of said abutment portion including tension member guide means with which the midportion of said tension member is guidingly engaged, said pull means being anchored to said frame and operatively engaged with the second end portion of said tension member on the side of said guide means remote from said first marginal portion of said load bed.

8. The combination of claim 7 wherein said pull means comprises a winding member upon which the second end portion of said tension member is wound.

* * * * *